UNITED STATES PATENT OFFICE.

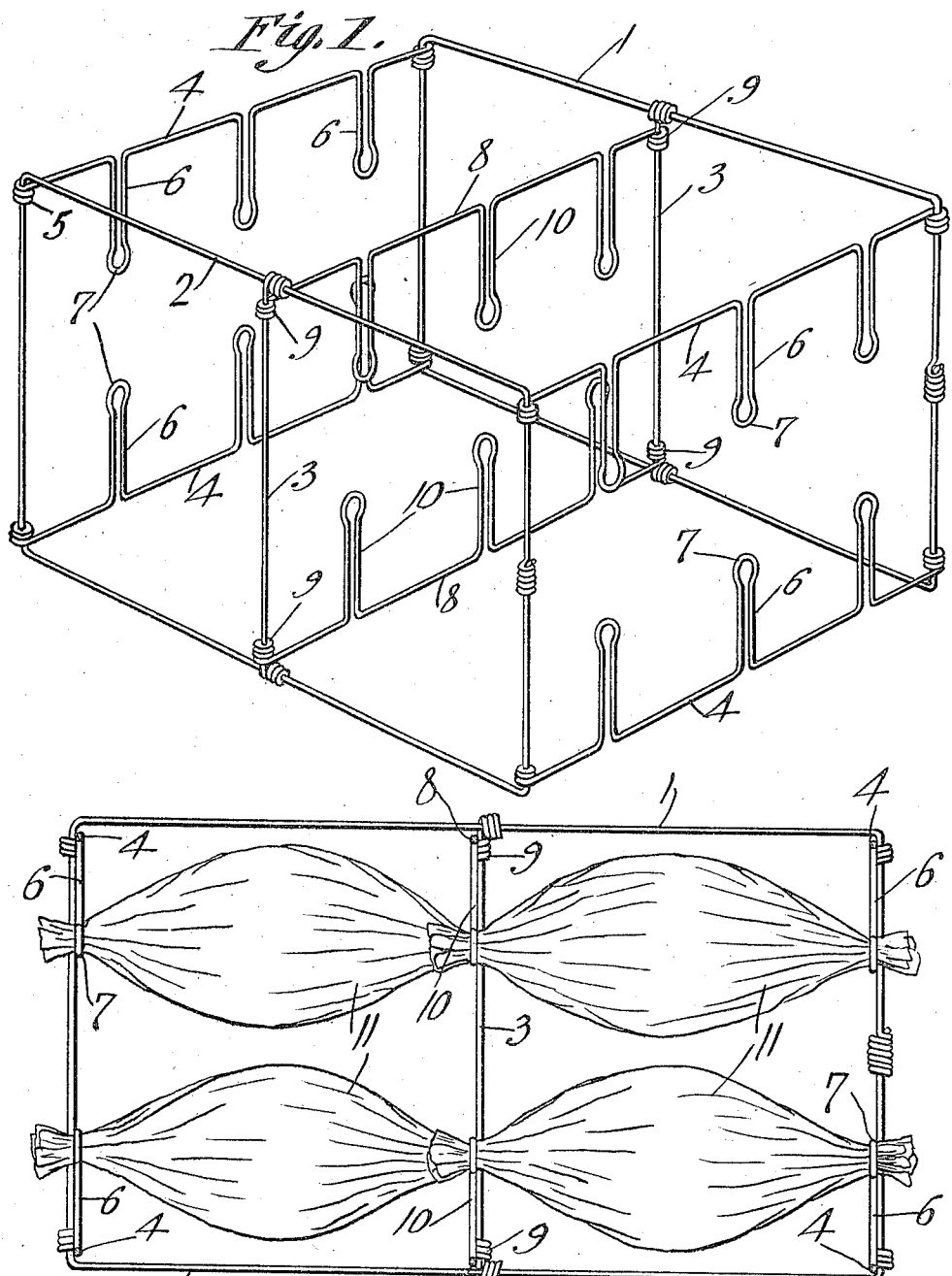

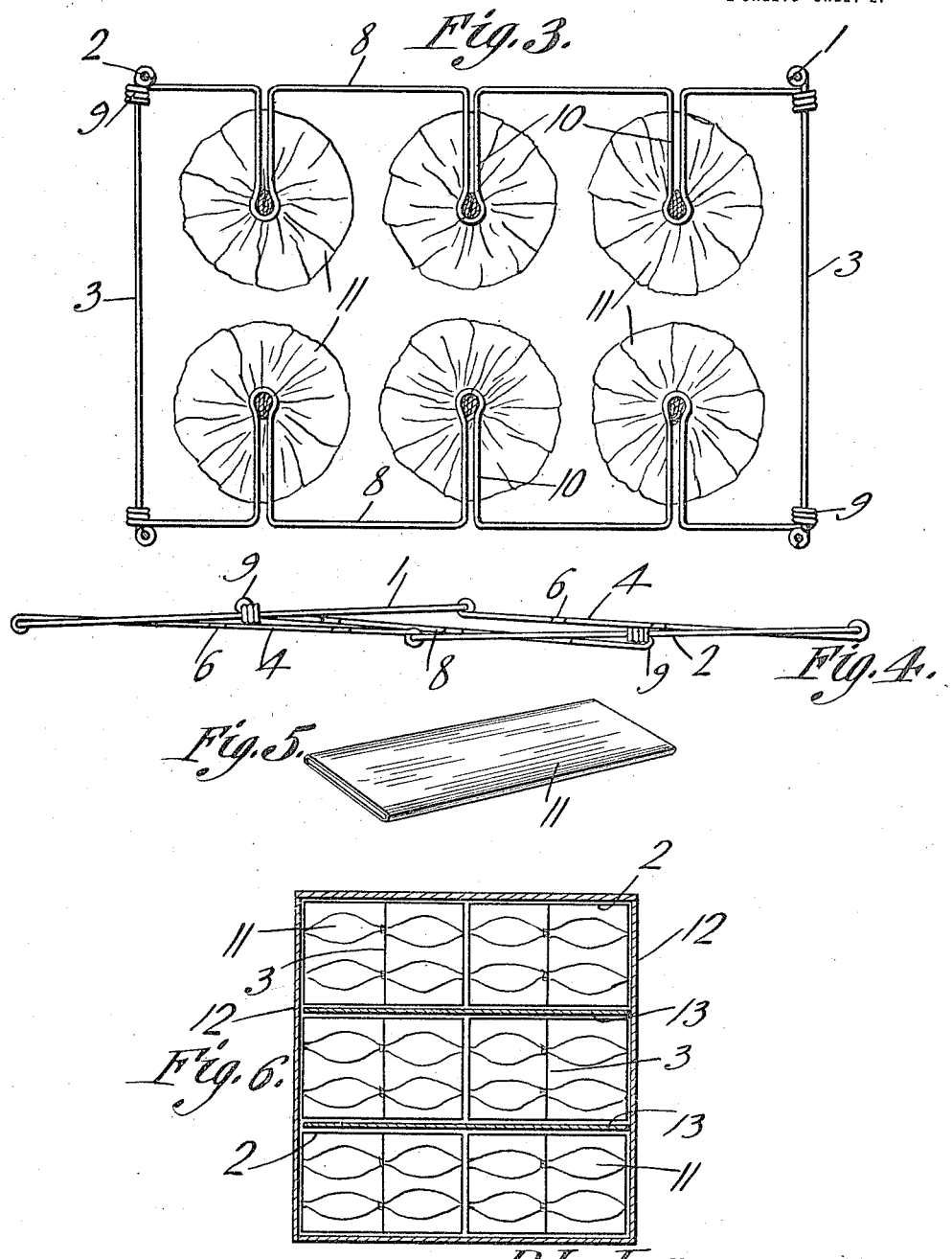

PETER L. LAZARUS, OF WICHITA, KANSAS.

EGG-HOLDER.

1,306,918.     Specification of Letters Patent.     Patented June 17, 1919.

Application filed July 17, 1916. Serial No. 109,868.

*To all whom it may concern:*

Be it known that I, PETER L. LAZARUS, a citizen of the United States, residing at Wichita, in the county of Sedgwick and State of Kansas, have invented a new and useful Egg-Holder, of which the following is a specification.

This invention relates to egg holders particularly designed for use in packaging eggs for shipment by parcel post, although the same is equally useful in the packaging of eggs sold by stores directly to the purchaser, the said holder eliminating the necessity of wrapping the eggs after they have been sold and providing a convenient means whereby the eggs can be carried without danger of injuring them.

A still further object is to provide an egg holder in the form of a unit designed to contain a number of eggs, said unit being so constructed that all of the eggs will be held out of contact with each other and will be cushioned when subjected to jars received from any direction.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a perspective view of one of the units set up for use.

Fig. 2 is a central horizontal section through the unit and showing eggs supported therein.

Fig. 3 is a central vertical section through the unit.

Fig. 4 is an edge view of the unit collapsed.

Fig. 5 is a detail view of one of the envelops used in connection with the device.

Fig. 6 is a vertical section on a reduced scale through a carton showing a plurality of held units therein.

Referring to the figures by characters of reference 1 and 2 designate rectangular side frames preferably formed of wire. Each of these frames is provided at an intermediate point with a cross wire 3 which may be attached to the opposed portions of the frame by coiling the ends of the wire or in any other manner desired.

The ends of the opposed frames 1 and 2 are connected by cross wires 4 preferably attached to the ends of the frames 1 and 2 by coils 5. Each of these cross wires 4 has elongated loops 6 extending therefrom, the free end portion of each loop being preferably enlarged slightly as at 7. The loops on the wires 4 at each end of the unit are extended toward each other and the frames 1 and 2 together with these end wires 4 form a unit which can be readily collapsed as shown in Fig. 4 so as to occupy the minimum amount of space.

Intermediate cross wires 8 are mounted upon the cross wires 3, and are connected thereto preferably by coils 9 formed at the ends of the wires 8. Said wires 8 have loops 10 similar to the loops 6, the loops on the two opposed wires being extended toward each other.

It is to be understood that the wires used in the construction of the unit are preferably of light spring metal sufficiently strong to support the objects placed in engagement with the unit.

When it is desired to pack eggs in the unit each egg is placed in a tubular envelop 11 preferably formed of stiff paper and the ends of the envelop are then twisted, after which one of said twisted ends is inserted into one of the loops 6 while the other twisted end of the envelop is inserted in the corresponding loop 10. The twisted end of a second envelop is then inserted into the same loop 10 while the other end of said envelop is inserted into the corresponding loop 6 at the other end of the unit. Thus two eggs will be supported substantially in line between the ends of the unit, the intermediate loop 10 serving to support the inner or meeting ends of the two envelops containing the eggs.

With a construction such as illustrated in Figs. 1, 2 and 3, the unit may be provided with two layers of eggs, each layer including six envelops properly filled. Obviously the envelops will hold the eggs suspended out of contact with each other as shown in Figs. 2 and 3 and also within the bounds of the unit so that where two or more units are assembled close together the eggs carried by one unit can by no possibility come against the eggs carried by the next adjoining unit.

As the wires 4 and 8 are formed of spring metal it will be apparent that should the unit be dropped or in any other manner subjected to sudden jarring, these wires will be free to yield so as to properly cushion the articles and absorb the jar. Likewise the loops 6 and 10 are free to flex toward or from each other to absorb any shocks which would not be absorbed by the flexing of the wires 4 and 8.

As shown somewhat in diagram in Fig. 6, a carton 12 may be provided and in this carton may be placed superposed layers of units each filled as above described, the layers being separated by interposed sheets 13 of paper board or the like. Units thus packed can be shipped by parcel post and it has been found in practice that although they might be subjected to excessive rough handling the eggs will at all times be efficiently cushioned and prevented from cracking.

A holder such as described is not only advantageous for shipping the eggs used for ordinary purposes but also for shipping settings of eggs which must be thoroughly protected from shocks as the air cells within them are otherwise likely to be broken.

In addition to the utility of the device as a means for holding eggs while being shipped by mail or express, the same is also advantageous as a container for handling eggs in stores. Each container may be constructed to hold a given number of eggs, as for example one dozen, and the filled units or containers can be piled on a shelf or counter and handed to the purchasers without the necessity of wrapping or otherwise protecting them. The purchaser by taking hold of the middle wire 8 can carry the unit in the same manner as a basket and at the same time accidental dropping of the unit or violent contact with an obstruction will not ordinarily result in injury to any of the eggs contained therein.

What is claimed is:—

An egg holder formed entirely of spring wire and comprising opposed frames, cross wires having terminal coils pivotally engaging the opposed frames, elongated loops extending from each of the cross wires, the free end portion of each loop being enlarged, the loops on opposed cross wires being extended toward each other, intermediate cross wires mounted upon the first named cross wires and mounted to swing thereon, loops extending from the intermediate cross wires, the said loops having enlarged free end portions, enlarged portions of the corresponding loops upon all of the wires being disposed in alinement, the wires and frames being foldable relative to each other.

In testimony that I claim the foregoing as my own I have hereto affixed my signature in the presence of two witnesses.

PETER L. LAZARUS.

Witnesses:
IVY E. SIMPSON,
PHILOMENA A. ROCKELLI.

Copies of this patent may be obtained for five cents each, by addressing the "Commissioner of Patents, Washington, D. C."